United States Patent [19]

Matsuyama et al.

[11] 3,825,052
[45] July 23, 1974

[54] PNEUMATIC RUBBER TIRE FOR OFF-ROAD VEHICLES

[75] Inventors: Takashi Matsuyama; Tetsuji Tanaka; Toshiro Tezuka, all of Tokyo, Japan

[73] Assignee: Bridgestone Tire Company Limited, Tokyo, Japan

[22] Filed: May 15, 1973

[21] Appl. No.: 360,593

[30] Foreign Application Priority Data
Aug. 5, 1972   Japan.................................. 47-78024

[52] U.S. Cl. ............................ 152/353, 152/209 B
[51] Int. Cl. ....................... B60c 13/00, B60c 11/00
[58] Field of Search ................. 152/209 B, 352, 353

[56] References Cited
UNITED STATES PATENTS
2,199,466  5/1940  McRaven........................... 152/353
2,572,259  10/1951  Gottschall........................... 152/353
3,457,981  7/1969  Verdier............................ 152/209 B
3,516,467  6/1970  Sims.................................... 152/353

FOREIGN PATENTS OR APPLICATIONS
1,232,331  10/1960  France................................. 152/353

Primary Examiner—Drayton E. Hoffman
Attorney, Agent, or Firm—Fleit, Gipple & Jacobson

[57] ABSTRACT

A pneumatic rubber tire for off-road construction vehicles, having two annular projection means which are integrally formed with opposing sidewalls of the tire so as to extend away from tire equatorial plane. The two projection means provide protective surfaces for preventing stones and rocks from damaging the tire sidewall. The projection means are so dimensioned as to cause substantially no temperature rise in the tire by the presence thereof.

8 Claims, 6 Drawing Figures

FIG.1

PRIOR ART

FIG_2

FIG_3

FIG_4

FIG_5

FIG_6

PNEUMATIC RUBBER TIRE FOR OFF-ROAD VEHICLES

BACKGROUND OF THE INVENTION

1. Field of the Invention

This invention relates to a pneumatic tire, and more particularly to a pneumatic rubber tire for off-road vehicles, such as construction vehicles to be operated on rough grounds or quarry.

2. Description of the Prior Art

Pneumatic tires are susceptible to side cuts and cracks on the outer surface thereof, because rocks and heavy wooden stumps with sharp corners come into contact with the tire sidewalls and sometimes stab into the tire, as the construction vehicle moves around on the rough ground.

In order to prevent such side cuts, it has been proposed to use thick rubber sidewalls to protect the side portions of the tire. The use of thick rubber sidewalls tends to make the pneumatic tire too heavy. The thick sidewalls also tend to deteriorate heat dissipation, and may result in an excessive temperature rise.

U.S. Pat. No. 3,457,981, which was granted on July 29, 1969 to Henri Verdier (to be referred to as "Henri Verdier"), discloses the use of an annular ridge substantially at the junction of tread and at least one sidewall. Being located at such junction, the annular ridge of Henri Verdier tends to hamper heat dissipation from the inside of the tire, and may cause excessive temperature rise in the tire. In fact, Henri Verdier uses deep grooves on the tire tread, which grooves extend into the annular ridge so as to define a plurality of discontinuous sections in the ridge. The grooves in the annular ridge provide paths for heat dissipation so as to limit the temperature rise of the tire within a reasonable range. However, once the annular ridge is divided into discontinuous sections, gravels and other objects with sharp corners may directly strike the tire sidewall, and the desired function of the annular ridge will not be fulfilled.

More particularly, the annular ridge of Henri Verdier causes an increase of the thickness of tire tread at shoulder portions thereof. Thick tire shoulders will hamper the heat dissipation from the tire inside, and the tire temperature is increased, so that deterioration of rubber and cord materials in the tire is accelerated by such temperature increase. As a result, various tire materials are weakened and the bondage between different members in the tire tread will be loosened.

The thickness of the rubber at the tire shoulder portion is critical in determining the tire inside temperature rise. It has been known that, when a tire rolls under loaded condition, the temperature at edge portions of a breaker surrounding the outer periphery of tire carcass increases most, as compared with other parts of the tire. When the thickness of rubber layer at the tire shoulder increases, the path for dissipating heat from the hottest portion of the tire to the outside becomes longer. Accordingly, the balance between the heat generation at such portion and heat dissipation therefrom is changed and heat energy is accumulated in the tire. Thus, the tire inside temperature rises excessively and tire damage is caused.

The excessive temperature rise at the edge portions of the tire breaker is particularly undesirable in the case of heavy tires for off-road construction work. To provide high strength against rough conditions to be experienced in construction work, tires having steel cords in breaker and/or carcass have been proposed. With such tires having steel cords in breaker and/or carcass, if the temperature at the breaker edges rises excessively, the steel cords in the breaker tend to cause breaker separation.

In short, there are contradicting requirements for heavy tires for off-road construction vehicles: namely, the protection against side cuts and the suppression of temperature rise within the tire.

Therefore, an object of the present invention is to mitigate the aforesaid difficulties of conventional heavy tires for off-road construction vehicles, by providing an improved pneumatic tire for such purposes while simultaneously meeting the aforesaid two contradicting requirements.

SUMMARY OF THE INVENTION

The present invention provides a means for preventing side cuts, which means does not cause any excessive temperature rise in the tire. Accordingly, the present invention diminishes the risk of tire damage due to excessive temperature rise.

The present invention is particularly useful for radial tires, especially radial tires having steel cords in breaker and/or carcass. Such radial tires have not been used for off-road construction vehicles despite their excellent performance characteristics, because they are susceptible to side cuts. More particularly, the structure of the present invention prevents troubles which have been experienced frequently with radial tires with steel cords in carcass; namely, side cuts and rubber separations at end portions of the steel cords in the carcass and chafer.

According to the present invention, there is provided a pneumatic rubber tire for off-road construction vehicles, comprising an annular tread having a pair of parallel edge corners, two sidewalls extending inwardly from opposite side edges of said tread, beads at inner edges of said sidewalls, a carcass means extending across the beads, and two projection means, which two projection means are integrally secured to said two sidewalls, respectively so as to project away from a plane passing equator of the tire in excess of each sidewalls, each of said two projection means having an outer peripheral edge thereof, relative to the axis of rotation of the tire, spaced from corresponding one of said tread edge corners by a distance $y_1$ and an inner peripheral edge thereof spaced from said corresponding tread edge corner by a distance $y_2$, said spacings $y_1$ and $y_2$, as taken radially relative to the axis of rotation of the tire, equalling to 10 to 30 percent of cross-section height H of the tire and 35 to 45 percent of the height H, respectively, each of said projection means providing a protective surface which prevents stones to strike the tire sidewall.

With an embodiment of the present invention, each of the two projection means of the aforesaid tire are formed in a continuous ring-shaped projection.

According to another embodiment of the invention, a pneumatic rubber tire with steel carcass plies is provided for the use with off-road construction vehicles.

BRIEF DESCRIPTION OF THE DRAWING

For a better understanding of the invention, reference is made to the accompanying drawing, in which.

Like parts are designated by like numerals and symbols throughout the different figures of the drawing.

DESCRIPTION OF THE PREFERRED EMBODIMENTS

Figure 1:
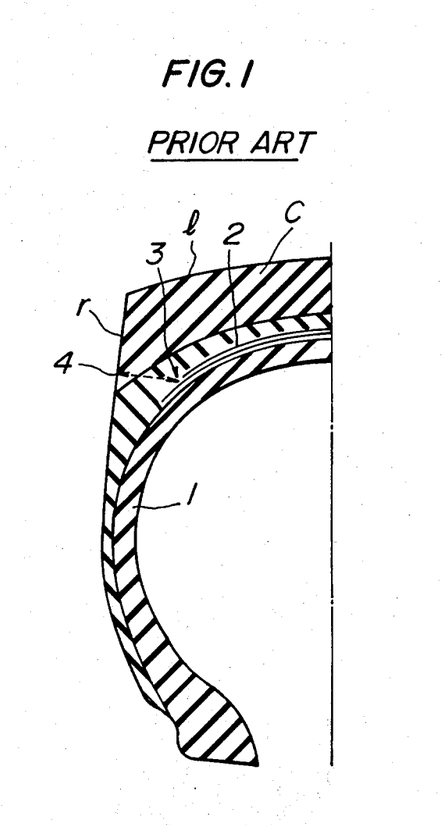
FIG. 1 is a sectional view of a conventional pneumatic tire with tread lugs.

Before entering the explanation of the present invention, a pneumatic tire of conventional construction will be briefly reviewed. A conventional pneumatic tire with lugs $l$ for off-road construction vehicles and the like comprises a plurality of plies 1, such as cross plies, and breaker layers 2. When the vehicles run, the highest temperature in the pneumatic tire appears at opposite edge portions 3 of the breaker layers 2. Breaker layers are embedded in the rubber body of tire crown C, and the breaker edge portions 3 are usually spaced from the edge surfaces $r$ of the crown C by a distance of about one-eighth of the width of the crown C, i.e., the tread width.

The location of the highest temperature portions of the tire of such construction somewhat varies, depending on the shape and on the disposition of the lugs $l$ at the crown portion C thereof. However, in the case of tires for off-road construction vehicles which are to be operated on rocky or rough grounds, the highest temperature portions of the tire are located at or in the proximity of the points 3 of FIG. 2.

Since considerable temperature rise takes place at the opposing edge portions 3 of the breaker layers 2, breaker separation often occurs at such breaker layer edges during operation. The temperature rise also tends to cause other tire troubles.

The heat energy generated at the breaker edge portions 3 is transferred to the tire inside and to the outside of the tire through the rubber material surrounding the breaker edges. The heat energy directed to the inside is absorbed by the air in the tire and further transferred to a metallic rim on which the tire is mounted, and the heat is finally dissipated to the outside air from the metallic rim. The heat dissipation to the rim through the tire inside air amounts to only 10 to 15 percent of the total heat which is dissipated from the tire breaker edge portions. The remaining portion of the heat energy from the tire breaker edge portions are dissipated to the outside air through the rubber material surrounding such portions, namely, through rubber body of the tire tread and the sidewall.

The rate of heat dissipation through the rubber material depends on the thickness of the rubber layer, in terms of the distance from the breaker layer edges to the outside of the tire. Accordingly, in order to prevent the occurrence of tire troubles due to the heat accumulation, it is desirable to minimize the aforesaid thickness of rubber material surrounding the edge portions of the breaker layers. When the thickness of the rubber body from the breaker layer edge portions to the outside air is small, the rate of heat dissipation becomes high, and the breaker layer edge portions can be kept at a comparatively low level, so that tire troubles due to excessive temperature rise there can be prevented.

Figure 2:
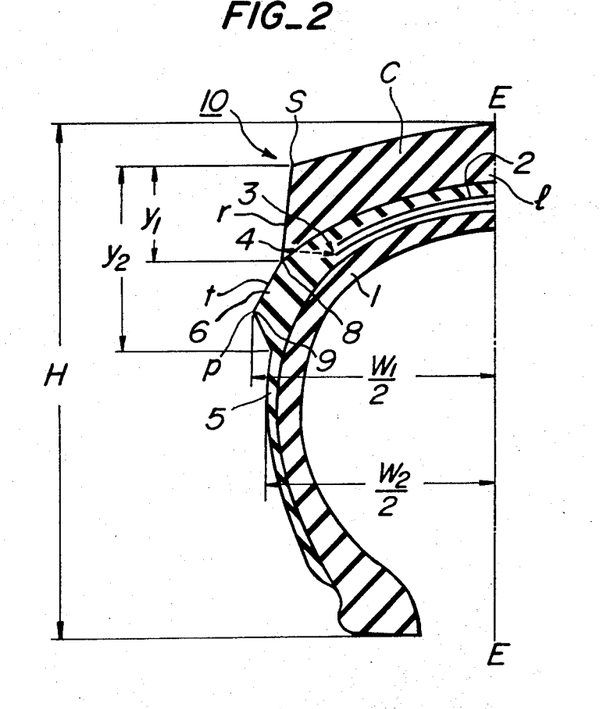
FIG. 2 is a sectional view of an embodiment of a pneumatic rubber tire with cross plies, according to the present invention.

A pneumatic tire according to the present invention will now be described, by referring to an embodiment, as illustrated in FIG. 2. A projection means 6 is formed on sidewall 5 of a tire 10, with a spacing from a side edge corner S of tire crown C, or tire tread. More particularly, the outer peripheral edge 8 of the projection means 6, relative to the axis of rotation of the tire (not shown), is spaced from the edge corner S by a distance $y_1$, while the inner peripheral edge 9 of the projection means 6, relative to the axis of rotation of the tire, is spaced from the edge corner S by a distance $y_2$. The distance $y_1$ is so selected that distance 4 from tire breaker edge portion 3 to the outside of tire through rubber body is kept substantially the same as that without the projection means 6, as shown by the dotted line in FIG. 2. As a result, the heat dissipation from the breaker edge portion 3 to the outside of the tire through the rubber material surrounding the tire breaker is substantially unaffected by the presence of the projection means 6.

The object of providing the projection means 6 is to form a side-cut-preventing surface $t$, as shown in FIG. 2. This surface $t$ is to prevent rocks or other blocks with sharp corners from coming toward the sidewall 5 of the tire 10. As long as the sidewall 5 is kept free from being struck by the rocks and other sharp-cornered blocks, the risk of side cut of the tire is eliminated. The temperature of the projection means 6 itself can be kept below that of the breaker edge portion 3, by properly designing it.

The aforesaid distances $y_1$ and $y_2$ are determined on the basis of tire dimension under inflated condition.

To achieve the desired cut-preventing effect, the projection means 6 should extend away from a plane E-E passing through tire equator in excess of the sidewall 5. FIG. 2 illustrates only one half side of a section of the tire 10, but another projection means 6 similar to that as illustrated in FIG. 2 is provided on the opposite sidewall of the tire. When the tire 10 is inflated, the distance $W_1$ between extended extreme ends $p$ of the two projection means 6 (only one half of the distance $W_1$ is shown in FIG. 2) should be greater than the width $W_2$ of the tire at the sidewall portion 5 (only one half of the distance $W_2$ is shown in FIG. 2).

The inventors have found out the aforesaid distance $y_1$ should be in a range of 10 to 30 percent of crosssection height H of the tire 10. If the distance $y_1$ is smaller than 10 percent of the height H, the heat dissipation from the inside of the tire crown portion C becomes insufficient and the breaker edge portions 3 tend to become excessively hot. On the other hand, if the distance $y_1$ becomes greater than 30 percent of H, the satisfactory cut-preventing effect of the projection means 6 cannot be achieved.

The inventors also found that the aforesaid distance $y_2$ should be within a range of 35 to 45 percent of the tire section height H. If the distance $y_2$ is less than 35 percent of H, the projection means 6 becomes too thin for effectively stopping rocks and other sharply-edged blocks by the projection means. On the other hand, if the distance $y_2$ becomes greater than 45 percent of H, the projection means 6 becomes excessively thick, and the flexibility of the projection means becomes too small for ensuring smooth operation of the tire 10.

In short, with the present invention, the tire 10 is protected from side cuts by using the projection means 6 without causing any undesirable temperature rise in the tire crown portion C.

In a preferred embodiment of the present invention, the projection means is a continuous annular rubber ring, so as to completely protect the entire span of the sidewall 5 of the tire. The projection means 6, however, is not restricted to be continuous. For instance, narrow grooves may be formed at suitable intervals on the projection means 6 if so desired, provided that such grooves would not weaken the mechanical strength and the cut-preventing function of the projection means.

Figure 3:
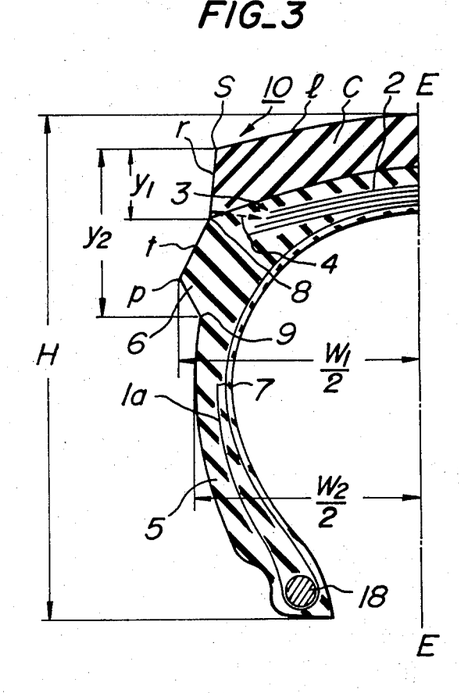
FIGS. 3, 4, and 5 are sectional views of steel radial tires, according to the present invention.
Figure 4:
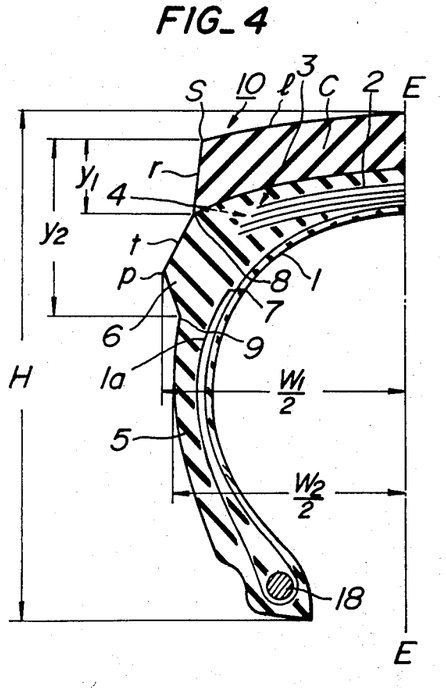

FIGS. 3 and 4 illustrate steel radial tires, according to the present invention. In the case of steel radial tires, it has been experienced that edge portions 3 of breaker layers 2 often cause troubles, because there is a considerably large discontinuity of rigidity at the junctions between the breaker layers and the surrounding rubber material. The edge portions 3 may or may not be the hottest spot in the tire, but the temperature at the portions 3 must be kept at minimum in view of the aforesaid large discontinuity of rigidity there. In the embodiment of FIG. 3, projection means 6 is formed as an integral part of sidewall 5 of a steel radial tire 10. In the embodiment of FIG. 3, the symbol 1a represents that portion of the steel cords of carcass 1 which are turned back upwardly at a tire bead 18.

Figure 5:
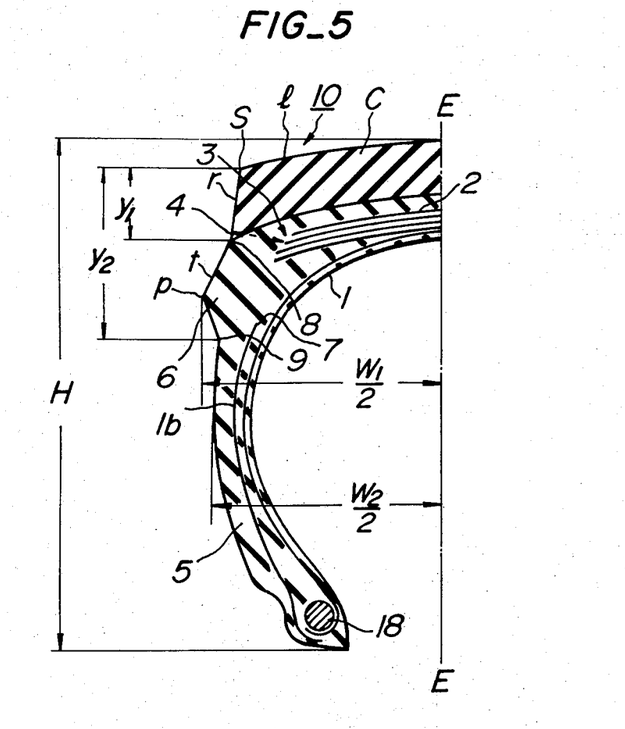
Figure 6:
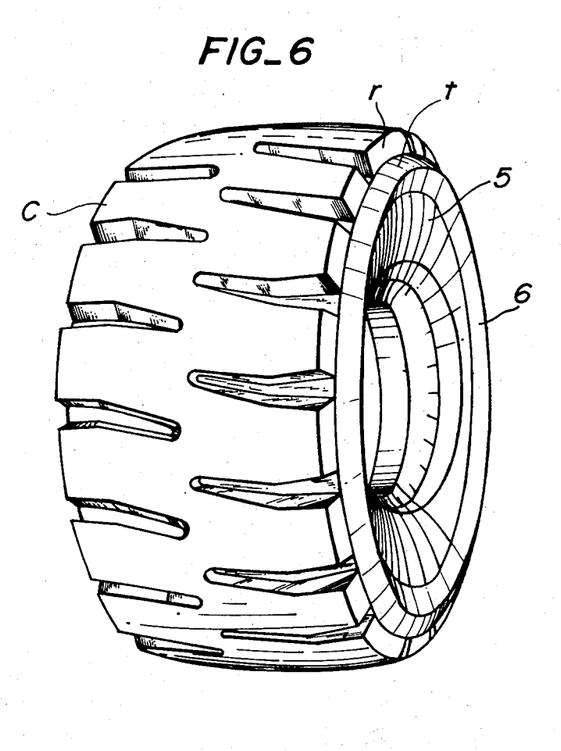
FIG. 6 is a perspective view of a tire according to the present invention.

To improve the rigidity of the tire sidewall 5, the turned-up portions 1a of the steel cords of the carcass 1 may be so extended as to cover most of the sidewall 5, as shown in FIG. 4. It is also possible to use separate steel cords 1b in the sidewall 5 for reinforcement, as shown in FIG. 5. The reinforcing steel cords 1a and 1b may completely or partly be replaced with suitable fibrous cords, such as nylon cords, polyester cords, or vinylon cords. The sidewall 5 may, of course, be reinforced by any combination of the aforesaid fibrous cords and steel cords. Radially outer ends 7 of the reinforcing cords 1a and 1b are subjected to concentrated stresses which are directed away from the plane E—E passing through tire equator, because the cords 1a and 1b must bear loads applied to the sidewall 5. When the aforesaid steel reinforcing cords 1a or 1b are used, the concentration of the outwardly directed stresses often results in separation of the steel cords and the cracks in the rubber sidewall 5.

The inventors have found out that the projection means 6 is also effective in preventing such reinforcing steel cords separation and sidewall rubber cracks. According to the embodiment, as shown in FIGS. 4 and 5, the radially outer ends of the steel reinforcing cords 1a and 1b are embedded in the rubber sidewall at a position between the projection means 6 and the tire carcass ply 1. The projection means 6 provides extra strength to the sidewall rubber layer 5, so that the concentration of the outwardly directed stresses at the end portions 7 are safely born by the combination of the sidewall rubber and the projection means. Thus, there will be no excessive deformation of the sidewall due to the concentrated stress at the outer end portions 7. Consequently, the separation of the reinforcing cords and the sidewall cracks can be effectively prevented. Of course, the arrangement of FIGS. 4 and 5 is useful for preventing the cord separation and sidewall cracks in the case of reinforcing cords made of fibrous materials.

With the tire construction according to the present invention, as shown in FIGS. 2 to 5, the distance $W_1$ between outwardly extended extreme ends p-p of the two projection means 6 should be 102 to 140 percent of the tire width $W_2$ at the sidewall 5. If the distance $W_1$ is too large in excess of 140 percent of $W_2$, the projection means 6 itself becomes susceptible to cutting by stones and other sharply-edged blocks from the ground. On the other hand, if the distance $W_1$ is less than 102 percent of the tire width $W_2$, the desired cut-preventing effect cannot be achieved.

As described in the foregoing, according to the present invention, there is provided a pneumatic rubber tire for off-road construction vehicles, in which two projection means 6 are provided on the opposing sidewalls of the tire, so that sidewall cut of the tire is effectively prevented without causing any excessive temperature rise in the tire, especially in the tire crown and tire breaker layers. Furthermore, the structure according to the present invention can be applied to steel radial tires for providing an additional reinforcement to the sidewalls of such steel radial tires, by properly disposing the radially outer end portions of the reinforcing steel cords relative to the projection means of the invention. In fact, steel radial tires have not been used in practical construction work despite its excellent performance characteristics, because the conventional steel radial tires are susceptible to the aforesaid cord separation and sidewall cracks. The present invention successfully mitigates such difficulties in the conventional steel radial tires, so that various advantages of the steel radial tires will be made available to off-road construction vehicles.

What is claimed is:

1. A pneumatic rubber tire for off-road construction vehicles, comprising an annular tread having a pair of parallel edge corners, two sidewalls extending inwardly from opposite side edges of said treads, beads at inner edges of said sidewalls, a carcass means extending across said beads, and a substantially continuous projection means integrally secured to each of said sidewalls, respectively, so as to project away from a plane passing equator of the tire in excess of each sidewall, each of said projection means having an outer peripheral edge thereof, spaced from corresponding one of said tread edge corners by a distance $y_1$ and an inner peripheral edge thereof spaced from said corresponding tread edge corner by a distance $y_2$, said spacings $y_1$ and $y_2$, as taken radially relative to the axis of rotation of the tire, equalling to 10 to 30 percent of cross-section height H of the tire and 35 to 45 percent of the height H, respectively, each of said projection means providing a protective surface which prevents rocks from striking the tire sidewall.

2. A pneumatic rubber tire according to claim 1, wherein each of said projection means is a continuous annular rubber member which is integrally formed with the tire sidewall so as to provide a continuous annular protective surface.

3. A pneumatic rubber tire according to claim 1 and further comprising sidewall reinforcing cords extending from the bead to the annular tread through the sidewall, and the radially outer ends of the reinforcing cords are disposed between said projection means and that portion of the carcass means which is closest to the projection means.

4. A pneumatic rubber tire according to claim 3, wherein the reinforcing cords are steel cords.

5. A pneumatic rubber tire according to claim 3, wherein the reinforcing cords are fibrous cords made of synthetic fibers.

6. A pneumatic rubber tire according to claim 3, wherein said carcass means consists of parallel cords, and said reinforcing cords in the sidewalls are formed by folding back the carcass cords around the beads.

7. A pneumatic rubber tire according to claim 3, wherein said reinforcing cords in the sidewalls are cords which are separated from said carcass means.

8. A pneumatic rubber tire according to claim 1, wherein distance $W_1$ between furthest ends of the two projection means, taken at right angles to the plane passing through the tire equator, is equivalent to 102 to 140 percent of width $W_2$ of the tire across the two sidewalls, under inflated condition.

* * * * *